Patented May 25, 1943

2,319,885

UNITED STATES PATENT OFFICE 2,319,885

PROCESS AND COMPOSITION FOR TREAT-
MENT OF EMULSIONS

Claudius H. M. Roberts, Palos Verdes Estates,
Calif., assignor to Petrolite Corporation, Ltd.,
Wilmington, Del., a corporation of Delaware No Drawing. Application October 8, 1940,
Serial No. 360,294

22 Claims. (Cl. 252—340)

This invention relates to a process and composition for the treatment of emulsions and, more particularly, for the resolution of crude oil emulsions, which may be naturally occurring or which may be intentionally produced.

The production and processing of crude petroleum frequently gives rise to the formation of emulsions. Crude oil is often produced as an oil-continuous emulsion containing as much as 40% or more of dispersed droplets of oilfield water or brine. Since the usual requirements for pipe-line oil and refinery charging stocks specify a maximum water content of not over 1 or 2%, it is necessary in many instances to dehydrate the crude oil in order to remove the emulsified water or brine and bring the water content within the specified limits. Such dehydration is normally accomplished by breaking or resolving the emulsion, as by subjecting it to the action of chemical de-emulsifying agents, or the like.

For the purposes of dehydrating crude oil and for resolving similar types of emulsions, many de-emulsifying agents have been developed and are widely known to the art. Such agents include materials such as soaps of fatty acids and modified fatty acids, oil-soluble or water-soluble petroleum sulphonic acids, substituted aromatic sulphonic acids, substituted amine acidic bodies, salts, and other compounds of the above organic acids, inorganic materials, typically those of alkaline reactions, such as alkali metal hydrates, carbonates, and the like and, in general, a wide variety of similar materials which have been developed and are available commercially as de-emulsifying agents for the indicated purpose.

Such de-emulsifying agents are employed in a conventional manner for the resolution of crude oil emulsions, being in most instances added directly to the emulsion in a solvent vehicle which may be soluble or dispersible in the oil or in the water, or both. Sufficient of the chemical is thus employed to effectively de-stabilize the emulsion, which is then allowed to separate by subsidence, suitably at elevated temperatures and pressures, into a layer of dehydrated oil and a layer of water or brine, which layers may then be separately recovered.

In many instances, it has been found more expedient to provide the de-stabilizing treatment prior to or during production of the crude oil. It has been established that, in most instances, the stabilized emulsion is not present as such in the interior of the well, which may be fed, for example, by an oil-producing stratum at one level and a water or brine-producing stratum at another level. Whatever the actual sources of the water or brine and the oil, it remains true that they are removed from the well in a concurrent stream which is subjected to substantial turbulence in its passage through the tubing, pump elements, pressure-reduction valves, or other equipment employed in bringing the oil to the surface. This turbulence or agitation has the effect of dispersing the water or brine as small droplets throughout the oil, thereby producing the emulsion which requires special subsequent treatment for its resolution.

In many instances, it has been demonstrated that the injection into the well of a de-emulsifying agent prevents the formation of stable emulsions during the production period, and permits far more efficient production of dehydrated oil than does the resolution of the emulsion after it has been formed. This is perhaps due in part to the fact that the interfacial reactions of adsorption and stabilization require time for their perfection so that, for the resolution of an "aged" emulsion, substantially more physical or chemical activity is necessary than is required to prevent the formation of a stable emulsion in its incipient stages.

Various methods may be relied upon for the introduction of de-emulsifying agents into the well to commingle with the water or brine prior to extensive emulsification thereof with the oil. There may be provided a special tubing or pipe by means of which the de-emulsifying agent may be pumped down into the well or, in connection with fluid-lift type pumping operations, the liquid or gaseous fluid-lift media may be admixed with the de-emulsifying agent prior to being pumped down into the well, or the de-emulsifying agent may be pumped directly down into the well through the annular space between the tubing and casing, this latter method being feasible when the production is through the tubing.

In many instances, synthetic emulsions may be purposely formed and then subjected to resolution. Thus, for example, it may be found that a dehydrated oil in which the water content is below the specified 1 or 2% may still contain excessive quantities of salts due to a high concentration of dissolved salt in the remaining residual water or brine or to the presence of salt crystals. Such oils may be subjected to a special "desalting" process for the removal of salt and other water-dispersible impurities.

In the desalting operation, water relatively free from the impurities which it is desired to remove is admixed with the impure oil and dispersed therein by controlled agitation to produce a synthetic emulsion. This emulsion is then resolved, as by the introduction of a chemical de-emulsifying agent and subsidence under heat and pressure to obtain a body of purified oil and a body of separated water containing the major portion of the extracted impurities.

Varying degrees of difficulty may be encountered in resolving and separating emulsions of the kind described. To a large extent, such emulsions may be stabilized by the presence of the natural emulsifying agents in crude petroleum, and it is primarily for the purpose of overcoming such stabilization that the chemical de-emulsifying agent is employed. Sufficient of the de-emulsifying agent must be added in order to effect destabilization of the interfaces and the coalescence and subsidence of the dispersed water or brine droplets.

In many instances, the coalescence and settling of an emulsion, whether chemically destabilized or otherwise treated, give rise to the formation of a layer of unresolved emulsion or sludge accumulating between the layer of water or brine and the layer of oil. This sludge is, in general, much slower to separate into clear oil and water or brine than is the bulk of the emulsion subjected to the settling process and, in many instances, the formation and accumulation of such sludge constitutes an effective limit on the speed with which the emulsion-breaking process may be carried out.

I have found that, in many instances, the difficulties attendant the breaking of emulsions and their separation into oil and water or brine are associated with the presence of polyvalent cations in the brine or water constituting the dispersed phase. Thus, for example, many of the de-emulsifying agents commonly employed may be classified as "water softeners" in that they tend to react with the constituents of the water or brine which are responsible for its hardness, namely, the alkaline earth ions and polyvalent cations of other metals, including iron and aluminum. The polyvalent cations, by virtue of such reaction, sometimes tend to consume the de-emulsifying agent and render it inactive. Furthermore, even with de-emulsifying agents which do not react directly with the polyvalent cations, the latter may still act to reduce the efficiency of the de-emulsifying agent, the colloidal effect of such ions being antagonistic to that of the de-emulsifying agent.

The polyvalent cations are susceptible to precipitation by a number of different agents and, in general, I find that the formation of such precipitates is objectionable in that they may tend to retard the steps of resolution and/or to assist in the formation or stabilization of emulsion sludges of the kind described. The polyvalent cations, including both the alkaline earth ions and various metallic ions, such as those of iron, copper, and aluminum, are susceptible to precipitation by an increase in the pH value of the aqueous phase such as may be occasioned by dilution, coalescence of unlike droplets in a mixed or complex type of emulsion, or by the use of alkaline agents which may be added either as de-emulsifying agents, or as adjuncts in the emulsion-breaking process which, in many instances, is best carried out with a slightly alkalinized aqueous phase. Thus, for example, insoluble hydrates, carbonates, etc., of such ions may readily form as a result of increased pH. Also, petroleum acids present in the oil may be converted into alkali soaps at higher pH values, which soaps may react with the pollyvalent cations to give water-insoluble soaps. Other conditions also frequently give rise to the formation of polyvalent precipitates. A frequently encountered instance is the formation of iron sulphide from iron which may be contained in the water or brine and from hydrogen sulphide which may be produced with or may be dissolved in the oil or which may be introduced into the system during processing, as when a hydrogen sulphide containing gas is employed in gas-lift pumping. In some instances iron sulphide may form as a precipitate simply as a result of increased pH in the aqueous phase, more particularly where the aqueous phase contains dissolved iron and sulphide ion in such concentrations as to exceed the solubility product at the lower hydrogen ion concentration. Precipitates which tend to be readily wetted by the oil, such as iron sulphide, form a particularly objectionable class of precipitates since, as a result of their presence, a very highly stabilized and tenacious sludge frequently forms during the step of settling.

Apart from the objectionable effect of the precipitates on the emulsion system undergoing separation, the formation of precipitates of polyvalent ion compounds is generally objectionable as giving rise to the formation of scale and similar deposits on the equipment, clogging of transfer lines and valves, etc.

It is an object of the present invention to provide an improved composition and method for the treatment of emulsions and, more particularly, to provide an inhibiting or protective agent adapted to suppress or overcome the deleterious effects of polyvalent cations or their insoluble reaction products in the treatment and resolution of emulsions and emulsion sludges.

It is a further object of the present invention to provide a protective agent adapted to prevent the degradation of the de-emulsifying agent by the action of the polyvalent cations in the water or brine and/or to render inactive or to sequester such polyvalent cations, and/or to peptize and maintain in colloidal solution in the aqueous phase any polyvalent precipitates, such as calcium soap, calcium carbonate, iron sulphide, etc., whereby such precipitates are maintained in a form adapted to suppress the formation of oil-continuous emulsions and/or sludges, or are at least maintained in a form ineffective for promoting oil-continuous emulsions.

The present invention is based in part upon my discovery that low molecular weight water-soluble hydroxycarboxylic acids, such as lactic and salicylic acids, particularly the class of low molecular weight water-soluble hydroxypolycarboxylic acids, such as citric and tartaric acids, and their alkali metal (including ammonium) salts, are effective in forming soluble un-ionized complexes with polyvalent cations such as those of calcium, magnesium, copper, iron, aluminum, and the like, in which the cations are sequestered with sufficient tightness that the complex or salt thus formed no longer constitutes a source of reactive calcium or other polyvalent ions for metathesis or other degradative reaction with the de-emulsifying agent, and that, furthermore, the protective agents of the class described possess the property of peptizing polyvalent precipitates such as alkaline earth or heavy metal soaps and inorganic precipitates, whereby, if the latter are formed, they may be maintained in the aqueous phase in a colloidally-dispersed form highly effective in preventing the formation of stabilized oil-continuous emulsions.

I have established that complete and permanent sequestration of the polyvalent cations may be accomplished by using quantities of the hydroxypolycarboxylic acids which are stoichiometrically equivalent to or in excess of the polyvalent cations constituting the undesired solutes. I have also established that very substantial inhibition or protection, which persists for a period of sufficient duration to permit the complete resolution of the emulsion without the rise of difficulties due to the presence of polyvalent precipitates, may be obtained by the use of quantities of the protective agent which are very much less than that stoichiometrically equivalent to the polyvalent cations, for example, quantities ranging from about $1/100$ to $1/1000$ of that stoichiometrically equivalent to the alkaline earth and metallic salts in the water or brine.

When used in stoichiometrical or greater proportions, I believe that the polyvalent cations are converted into soluble un-ionized complexes or salts of the polycarboxylic acid, in which form the polyvalent cations are no longer reactive to give rise to the undesirable effects previously described.

When very small proportions of the protective agent are employed, the complex formation may take place to the degree that the agent is added but, due to the presence of this complex or to other forms of the protective agent, the formation of precipitates of alkaline earth and metal soaps and of inorganic compounds is effectively suppressed or inhibited for at least a substantial period of time. I believe that this latter effect is due to a peptizing action which serves to keep the precipitates in a state of colloidal dispersion in the aqueous phase.

I have further established that the inhibitor may be successfully added to an emulsion to effect the peptization or solution or previously formed polyvalent precipitates such as alkaline earth or heavy metal compounds.

In the preferred class of hydroxylated polycarboxylic acids, I find that citric acid, together with its alkali and ammonium salts, is most effective. Citric acid with one hydroxyl and three carboxyl groups is more effective, for example, than tartaric acid having two hydroxyl and two carboxyl groups.

Hydroxylated carboxylic acids are in general efficacious, however, providing the acids and/or their salts are appreciably water soluble. The desired solubility characteristics are best displayed in the lower molecular weight acids, however, and I prefer to use acids containing not more than 7 carbon atoms in the molecule.

In most instances, I prefer to use the described protective agents in the form of sodium or other alkali metal (including ammonium) salts, although in instances where an alkali reserve is available in the composition employed as the de-emulsifying agent or in the water or brine, or where slight acidulation of the water or brine or de-emulsifying agent may be tolerated, I may employ the protective agents in the acidic form. The functional effect of the agent resides in the anion and the sodium salt of the acid usually provides the most economical source of the desired anion.

The proportions of protective agent relative to the de-emulsifying agent will vary according to the hardness of the water or brine and with other factors, including the degree of de-stabilization necessary for the resolution of the emulsion. The proportion of de-emulsifying agent required is primarily dependent upon the interfacial characteristics of the emulsion and, hence, more or less closely related to the character of the oil, while the inhibitor requirements depend upon the quantity of water or brine and its concentration in objectionable materials.

As indicated above, the quantity of inhibitor, typically sodium citrate, will normally be sufficient to provide from $1/100$ to $1/1000$ of that quantity stoichiometrically equivalent to the polyvalent cations, and may range from this value up to a stoichiometrical excess of inhibitor. The quantity of de-emulsifying agent, on the other hand, may range from nothing in the case of a very poorly stabilized emulsion up to one part or more per thousand parts of oil. In general, the quantity of de-emulsifying agent necessary to produce complete resolution of the emulsion will be found to be very much lessened by the presence of the indicated quantities of citrate ion or equivalent inhibitor. This cooperative effect of the citrate ion is apparently primarily dependent upon the suppression of the deleterious action of the polyvalent cations.

In the treatment of crude oil emulsions after their production from the well or of synthetic emulsions produced in desalting, the protective agent and the de-emulsifying agent may be added either separately or together. Their admixture as a preformed composition in proportions suitable for the intended use frequently constitutes a very convenient and advantageous way of practicing my invention. The protective agent particularly in the form of its alkali metal salt, may be readily brought into aqueous solution and may be added to the emulsion in this form. Frequently, however, it is desirable to provide the protective agent with a solvent vehicle, such as alcohol, which is dispersible or soluble in the external oil phase of the emulsion, thereby facilitating the rapid distribution of the protective agent throughout the emulsion and into the disperse aqueous phase. In these respects, the usage of the protective agent corresponds roughly with that developed for the addition of de-emulsifying agents to oil-continuous emulsions.

Where a synthetic emulsion is formed, as in desalting, it is frequently very advantageous to incorporate the protective agent in the added water prior to dispersal of the latter into the oil. The protected water may also be alkalinized or admixed with a de-emulsifying agent prior to dispersal if desired, although in many instances the de-emulsifying agent may very conveniently be added to the oil or to the emulsion after it is formed.

In any instance, the presence of citrate or equivalent agent during the resolution of synthetic emulsions results in greater purification and higher percentage removal of water-dispersible impurities, easier separation of the emulsion components, and control or suppression of sludging tendencies.

In treating emulsions down the well, the protective agent and de-emulsifying agent may be introduced into the well independently, if desired, but in most instances they are injected as a concurrent stream, suitably by providing a premixed composition comprising the protective agent and the de-emulsifying agent, which may then be introduced into the well at a rate sufficient to give the desired de-stabilizing or emulsion-suppressing results.

In most instances, I prefer to use sufficient quantities of such a composition to secure by the indicated down-the-hole treatment adequate protection against the formation of stabilized oil-continuous emulsions, whereby the mixture of oil and water or brine as produced at the surface may be conducted into a settling tank or gun barrel, or similar conventional apparatus, for rapid resolution by subsidence into water or brine and an oil of pipe-line quality, that is, an oil not containing more than about 1 or 2% of residual water or brine.

The quantity of protected de-emulsifier which it is necessary to employ in connection with this invention is, in general, substantially less than that required in the absence of a protective agent. Furthermore, many wells forming emulsions which cannot be prevented by the use of an unprotected de-emulsifier respond readily to combined treatment with a de-emulsifier and protective agent, such as sodium citrate.

If desired, the indicated down-the-hole treatment may also be used in conjunction with emulsion-breaking steps at the surface. For example, when producing an oil having a very pronounced tendency to emulsify and yielding emulsions which, in the absence of down-the-hole treatment, are recalcitrant toward chemical, electrical, or other emulsion-breaking methods, I may sufficiently destabilize the emulsions by limited down-the-hole treatment to permit their ready resolution by conventional emulsion-breaking methods at the surface after production.

In any emulsion-breaking process in which the separating constituents tend to leave a residual layer of unresolved sludge, agents of the character described, typically sodium citrate, may be used to very excellent advantage to reduce the stability of such sludge and/or to suppress its formation. For such purposes of sludge control, the optimum quantity of the agent to employ is frequently most conveniently determined by observation of the effect of adding increasing quantities of the agent. Such sludges may be formed or stabilized as a result of various factors, for example the conversion of fatty acid soaps into oil-dispersible alkaline earth soaps which may in some instances strongly promote the maintenance of an oil-continucus emulsion, or to the presence of precipitates like iron sulphide which, in view of their finely divided form and their wettability by the oil, tend to stabilize the sludge as a Pickering type emulsion. In general, agents of the type described, preferably sodium citrate, are adapted to remove the inciting causes of sludge formation and stabilization by processes of peptization or complex formation, as above-described, but as a practical matter, it is usually simpler to adjust the quantity of the agent on the basis of observed results than to analyze the system to determine the amount and character of the materials responsible for the formation of the sludge.

While agents of the kind herein-described have been frequently termed protective agents in the present specification, particularly when they are used in connection with de-emulsifying agents of the water softening type, it will be apparent that their efficacy is not limited to such joint use nor to the protection of a chemical de-emulsifying agent in a water or brine system. Thus, for example, in resolving an emulsion by any suitable means, such as by the use of a coalescing electric field or simple subsidence under heat and pressure, even in the absence of a de-emulsifying agent, the beneficial effects of the agents of the kind hereindescribed in peptizing or preventing the formation of polyvalent precipitates, such as calcium carbonate, iron sulphide, and the like, and in preventing formation of alkaline earth and metallic salts of organic soaps and/or acids naturally present in the oil, may be realized by conducting the step of settling in the presence of suitable quantities of the described agent, which may be added to the emulsion or its constituents at any suitable stage prior to the final step of separation.

Among the advantages resulting from the use of citrates and equivalent agents in the treatment of emulsions are the prevention of formation of undesirable alkaline earth and metallics soaps when using certain water-softening agents, thereby economizing on chemical, preventing sludge formation due to alkaline earth soaps, and avoiding the use of excess chemical to overcome the stabilizing effects of these soaps; the prevention of formation of undesirable precipitates of inorganic alkaline earth and metallic compounds, including iron sulphide formed by reaction between $H_2S$ and other acidic sulphur compounds in the gas or oil and iron compounds in the water, thereby preventing the formation of scale or deposits in the equipment and the stabilization of tenacious sludges; the effectivenes of the agent in either acid or alkaline solutions or brines; the extension of the protection to trivalent and divalent metallic compounds generally, as well as the alkaline earth compounds; the stability of the agent in the aqueous solutions (i. e., it does not hydrolyze or decompose even at elevated temperatures or in acidic solutions); its distribution of effectiveness over a wide range of proportions relative to the concentration of polyvalent cations ranging from as low as $1/1000$ or $1/100$ of an equivalent to an equivalent or greater; the ability of the agents to form un-ionized soluble complexes with the polyvalent cations which are adapted to completely sequester these ions when used in approximately stoichiometrical proportions; their ability in less than stoichiometrical proportions to act as powerful peptizing agents adapted to hold the precipitated materials in colloidal dispersion; their effectiveness when extractible organic soaps are formed by reaction of petroleum acids with alkaline agents to prevent the reaction of such soaps with alkaline earth or other polyvalent salts, or to maintain such polyvalent soaps peptized in colloidal dispersion if formed, thereby aiding separation and preventing sludge formation; and, in general, in increasing the degree of purification obtained in the removal of water-dispersible impurities from an oil by a desalting operation of the kind described.

The details of the above description are intended as exemplary rather than limiting, and various modifications obvious to one skilled in the art may be practiced without departing from the essence of my invention as defined by the scope of the appended claims.

I claim as my invention:

1. A process for treating emulsions of oil and water, which comprises: adding to said emulsion a demulsifying agent and an agent selected from the class consisting of hydroxylated carboxylic acids and their alkali metal and ammonium salts, said acids containing not more than seven carbon atoms in the molecule.

2. A process as in claim 1, in which the selected agent is adapted to yield polycarboxylate ion.

3. A process as in claim 1, in which the selected agent is adapted to yield citrate ion.

4. A process for breaking water-in-oil type emulsions in which the aqueous phase comprises polyvalent cations, which comprises: subjecting the emulsion to the action of a de-emulsifying agent and a second agent selected from the class consisting of hydroxylated carboxylic acids and their alkali metal and ammonium salts, said acids containing not more than seven carbon atoms in the molecule, said second agent being adapted to form soluble un-ionized complexes with said polyvalent cations.

5. A process for breaking crude oil emulsions of the water-in-oil type, which comprises: adding to said emulsion a de-emulsifying agent and sodium citrate; and separating the water from the oil.

6. A process for treating emulsions, which comprises: adding to said emulsion a small amount of an agent selected from the class consisting of hydroxylated carboxylic acids and their alkali and ammonium salts, said acids containing not more than seven carbon atoms in the molecule; resolving said emulsion into oil and water; and recovering the oil.

7. A process for removing water-dispersible impurities from oil which comprises: dispersing water in the impure oil to form a synthetic emulsion; resolving said emulsion in the presence of a small amount of an agent selected from the class consisting of hydroxylated carboxylic acids and their alkali and ammonium salts to form a body of purified oil and a body of separated water containing extracted impurities, said acids containing not more than seven carbon atoms in the molecule; and separately recovering said purified oil.

8. A process as in claim 7 in which the selected agent is added to the water prior to emulsification.

9. A process for removing water-dispersible impurities from oil, which comprises: dispersing water in said oil to form a synthetic emulsion; and subjecting said synthetic emulsion to the action of a de-emulsifying agent and an agent selected from the class of hydroxylated polycarboxylic acids and their alkali metal and ammonium salts, said acids containing not more than 7 carbon atoms in the molecule.

10. A process as in claim 9 in which the de-emulsifying agent is added to the oil and the selected agent added to the water prior to the dispersal of the water in the oil.

11. A process for the resolution of emulsions which tend to form sludge on breaking, which comprises: resolving said emulsion in the presence of a hydroxylated carboxylate anion derived from an agent selected from the class consisting of hydroxylated carboxylic acids containing not more than 7 carbon atoms in the molecule and their alkali and ammonium salts, said anion being present in at least sufficient quantity to prevent the stabilization of said sludge; and separately recovering the resolved water and oil.

12. A process as in claim 11, in which the anion is citrate ion.

13. A process for treating emulsions forming in the production of crude petroleum from wells in which both oil and water or brine accumulate, which comprises: introducing into the well to commingle with said water or brine prior to extensive emulsification thereof with the oil a de-emulsifying agent; and concurrently introducing into said well an agent selected from the class consisting of hydroxylated carboxylic acids and their alkali metal and ammonium salts, said acids containing not more than seven carbon atoms in the molecule.

14. A process as in claim 13, in which the selected agent is adapted to yield citrate ion in aqueous solution.

15. A composition of matter for the treatment of emulsions, comprising a de-emulsifying agent and an agent selected from the class of hydroxylated carboxylic acids and their alkali metal and ammonium salts, said acids containing not more than seven carbon atoms in the molecule.

16. A composition of matter for the treatment of emulsions, comprising a de-emulsifying agent of the water-softening type, and an ionizable compound which yields hydroxylated polycarboxylate ions in aqueous solution and which contains not more than 7 carbon atoms in the molecule.

17. A composition as in claim 16, in which the ionizable compound is one which yields citrate ions.

18. A process as defined in claim 7, in which the water dispersed into said oil is relatively free of said water-dispersible impurities which are to be removed from said oil.

19. A process as defined in claim 7, in which the water dispersed into said oil is alkalinized prior to dispersal thereof into the oil.

20. A process as defined in claim 7, in which said synthetic emulsion is resolved by coalescence and subsidence of the water in the presence of a chemical deemulsifying agent.

21. A process as defined in claim 7, in which a chemical deemulsifying agent is added to said oil to aid in the resolution of said synthetic emulsion, and in which said agent selected from the class consisting of hydroxylated carboxylic acids and their alkali and ammonium salts is added to said water prior to dispersal thereof into the oil.

22. A process as defined in claim 7, in which the oil to be purified carries a small amount of water containing polyvalent cations, and in which said agent is employed in amount less than that stoichiometrically equivalent to said polyvalent cations.

CLAUDIUS H. M. ROBERTS.